E. A. TAPPE.
SIGNAL APPARATUS FOR AUTOVEHICLES.
APPLICATION FILED AUG. 20, 1913.
1,104,281.
Patented July 21, 1914.
2 SHEETS—SHEET 1.
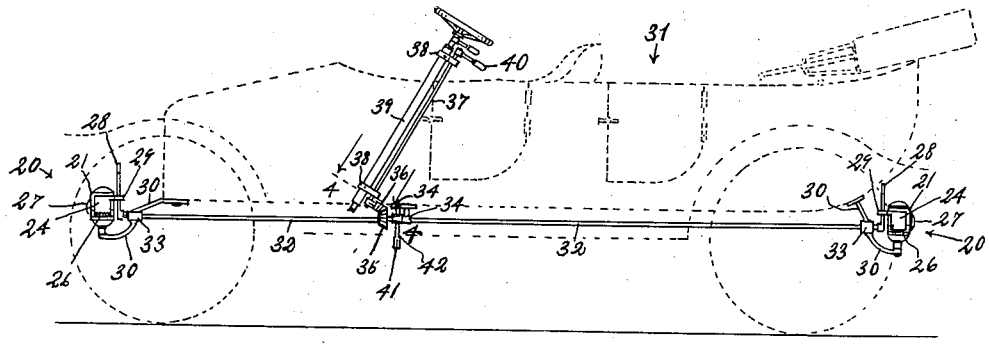
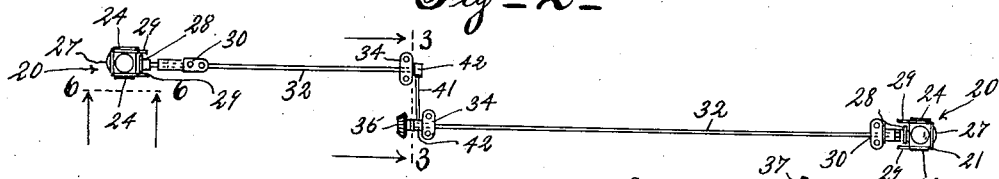
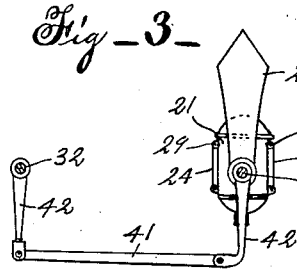
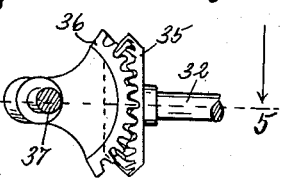
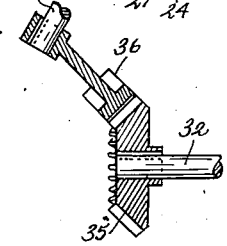
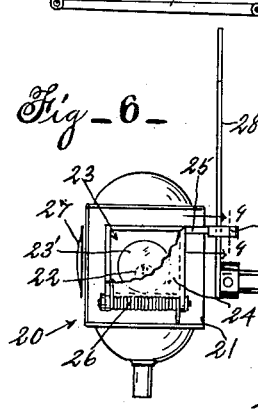
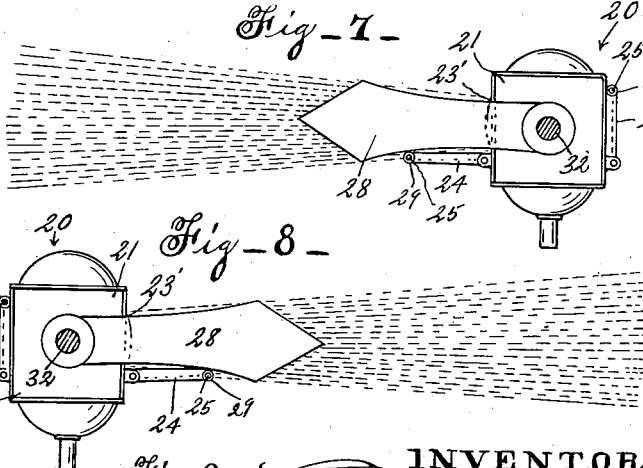
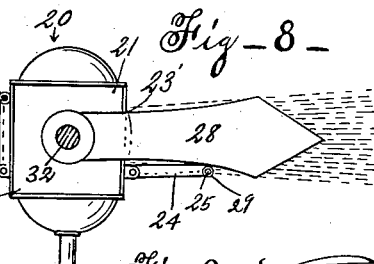
WITNESSES:
W. M. Gentle.
Edith Ramsey.
INVENTOR.
Edward A. Tappe
By Alex. N. Ledders
ATTORNEY.

E. A. TAPPE.
SIGNAL APPARATUS FOR AUTOVEHICLES.
APPLICATION FILED AUG. 20, 1913.
1,104,281. Patented July 21, 1914.
2 SHEETS—SHEET 2.
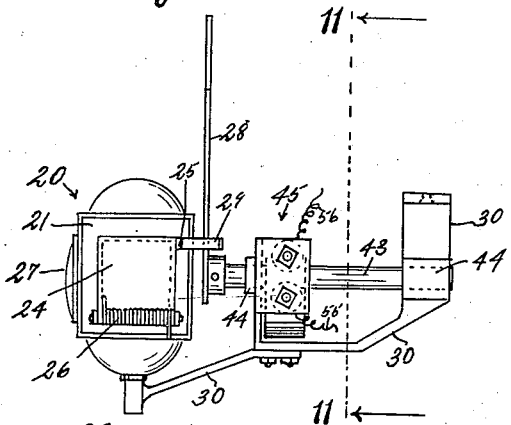
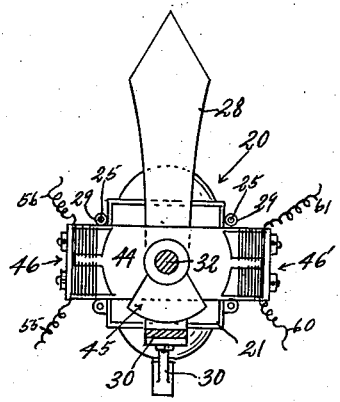
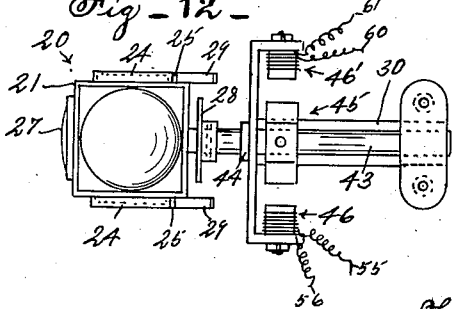
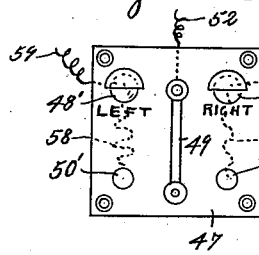
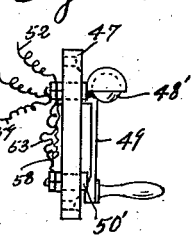
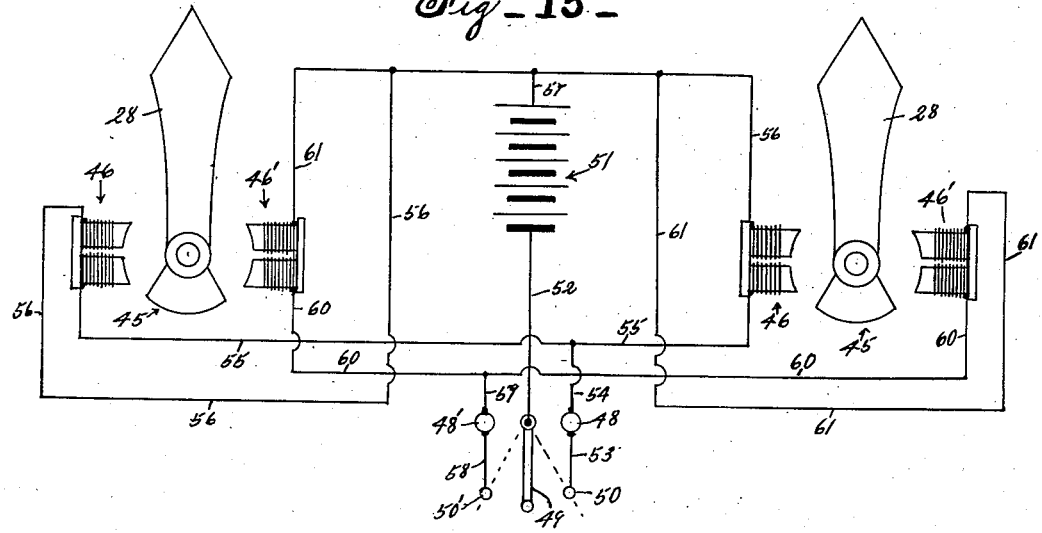
WITNESSES:
W. M. Gentle.
Edith Ramsey.
INVENTOR
Edward A. Tappe
By Alex H. Lidders
ATTORNEY.

UNITED STATES PATENT OFFICE.

EDWARD A. TAPPE, OF LOS ANGELES, CALIFORNIA.

SIGNAL APPARATUS FOR AUTOVEHICLES.

1,104,281.      Specification of Letters Patent.      Patented July 21, 1914.

Application filed August 20, 1913. Serial No. 785,788.

*To all whom it may concern:*

Be it known that I, EDWARD A. TAPPE, a citizen of the United States of America, residing at Los Angeles, county of Los Angeles, State of California, have invented a certain new and useful Signal Apparatus for Autovehicles; and I do hereby declare the following to be a full, clear, and exact description of the invention, such as will enable others skilled in the art to which it appertains to make and use the same.

This invention relates to signal apparatus for autovehicles, and it may be said to consist in the provision of the novel and advantageous features, and in the novel and improved construction, arrangement, and combination of parts and devices as will be apparent from the description and claims which follow hereinafter.

One object of the invention is to provide novel and improved apparatus of the class specified which is adapted to indicate at a distance from the vehicle the intention of the operator to turn the vehicle to the left, or to the right.

Further objects of the invention are to provide novel and improved apparatus of the class specified which is adapted for both day and night service, is simple in construction, comparatively inexpensive, easily applied to existing vehicles, economical to install and maintain, easy to operate, convenient to use, attractive in appearance and effective in action.

Other objects and the advantages of the invention will be apparent to those skilled in the art from a consideration of the following description of the preferred forms of apparatus embodying it, taken in connection with the accompanying drawings, in which—

Figure 1 is a view of the signal apparatus mounted on an autovehicle, which latter is indicated by dotted lines; Fig. 2 is a plan view of the signal apparatus; Fig. 3 is cross-sectional view of a portion of the apparatus, taken on the line 3—3 of Fig. 2; Fig. 4 is a partly broken and sectional view taken on the line 4—4 of Fig. 1; Fig. 5 is a sectional view taken on the line 5—5 of Fig. 4; Fig. 6 is an elevational view of a portion of the apparatus, taken on the line 6—6 of Fig. 2; Fig. 7 is a view of the signal arm and illuminating device, with the signal arm moved to one of its operative positions; Fig. 8 is a similar view with the signal arm moved oppositely to the position shown in Fig. 7; Fig. 9 is a cross-sectional view of the extension on the shutter, taken on the line 9—9 of Fig. 6; Fig. 10 is a elevational view of the signal apparatus, showing a portion of the electrical operating mechanism; Fig. 11 is a cross-sectional view taken on the line 11—11 of Fig. 10; Fig. 12 is a plan view of the construction shown in Fig. 10; Fig. 13 is a front view of the switch panel and parts thereon; Fig. 14 is a side view of the same, and Fig. 15 is a diagrammatic view of the electrical devices and circuits for operating the signal arm.

The illuminating device 20 comprises a casing 21 provided therein with suitable illuminating means 22, and having windows 23 in the sides thereof which windows are normally covered by shutters 24. The windows 23 may consist of glass lenses 23′ suitably fitted in openings in the sides of the casing 21. The shutters 24 are provided with extensions 25 at the upper ends thereof and they have the lower ends thereof hingedly mounted on the exterior of the casing 21. Springs 26 are arranged to press against the shutters to make them self-closing. The casing 21 may have in the front thereof the usual white or red glass lens 27. A signal arm 28, of suitable size, shape and color, is movably arranged on the exterior of and adjacent to the casing 21, preferably at the rear, and is adapted to be moved at will against the rollers 29 on the extensions 25 of the shutters 24 of either of the windows 23 to uncover such window and effect illumination of the signal arm.

The illuminating device 20 may be suitably mounted on one end of a bracket arm 30 which latter may be suitably affixed in any desired position on the autovehicle 31, for instance at the front or rear, or at both these positions.

Any suitable mechanical or electrical means may be employed to operate the signal arm 28. The mechanical means preferably consists of a shaft 32 which is rotatably mounted in a bearing 33 on the bracket arm 30 and in a suitable bearing 34, suitably affixed to the autovehicle 31, and which has one end thereof secured to the lower end portion of the signal arm 28 and has on its other end a bevel pinion 35 in mesh with a segmental gear 36 secured fast on the lower part of a rod 37 which latter is rotatably mounted in bearings 38 on the steering post 39 and has on its upper part a handle 40. When the signal apparatus is to be used at both the front and rear of the autovehicle, the signal arm shafts 32 may be operatively interconnected by means of a rod 41 which has its ends pivotally connected with the donwardly extending crank arms 42 which are mounted on the shafts 32.

The signal arm 28 is normally disposed in position between the extensions 25 of the shutters 24. When the handle 40 is turned to the right from central or normal position, the signal arm 28 is turned to the right and moves against the extension 25 of the shutter on the right side of the casing 21, and when said handle is turned to the left from normal position the signal arm is turned to the left and moves against the extension on the left side of the casing 21. It will be understood that light flashes through the windows 23 when they are uncovered by the signal arm moving against the shutters, and such light may be seen at a distance and also effects illumination of the signal arm so that the operator may thereby at will indicate his intention to turn the auto vehicle either to the right or to the left.

The electrical means for turning the signal arm 28 preferably consists of a shaft 43 which is secured to the signal arm and which is rotatably mounted in bearings 44 on the bracket arm 30 and carries an armature 45 which is arranged between the electromagnets 46 and 46′ which latter are suitably mounted on the bracket arm 30. When the electromagnets 46 and 46′ are deënergized the weight of the armature 45 brings the signal arm to and holds it in upright position between the extension 25. The panel 47 may be mounted within convenient reach of the operator and have thereon the hooded lamps 48 and 48′, switch 49, and contacts 50 and 50′. When the switch 49 is thrown to the right to engagement with the contact 50, the electromagnet 46 is energized to attract the armature 45 and turn the signal arm to the right by means of current supplied by source of electricity 51; the path of the current being through conductor 52, switch 49, contact 50, conductor 53, lamp 48, conductors 54 and 55, electromagnet 46, and conductors 56 and 57. When the switch 49 is thrown to the left to engagement with the contact 50, the electromagnet 46′ is energized to attract the armature 45 and turn the signal arm to the left by the current supplied by the source of electricity 51; the path of the current being through conductor 52, switch 49, contact 50′, conductor 58, lamp 48′, conductors 59 and 60, electromagnet 46′ and conductors 61, 56, and 57. The operation of the switch arm by the electrical means moves the shutters 24 and produces the results as already described in connection with the mechanical means. Fig. 15 shows a double arrangement of the signal apparatus for the front and rear of the auto vehicle.

It will be noted that the signal apparatus has the merit of being extremely simple in construction and that it is well adapted to accomplish the objects of the invention.

While forms of construction embodying the invention have been particularly illustrated and described, many changes and modifications thereof will readily occur to those skilled in the art—wherefore the right is reserved to all such changes and modifications as do not depart from the spirit and scope of the invention as defined in the appended claims.

I claim:

1. Apparatus of the class specified, comprising a casing having windows in the sides thereof, illuminating means in the casing, hinged spring-pressed shutters on the exterior of the casing normally covering said windows, and a rotatable signal arm arranged exteriorly of the casing and adapted to move against the shutter of either of the windows at will to uncover such window and effect illumination of the signal arm.

2. Apparatus of the class specified, comprising a casing having windows in the sides thereof, illuminating means in said casing, hinged spring-pressed shutters on the exterior of the casing normally covering said windows, a signal arm movably arranged exteriorly of and adjacent to the casing and adapted to move against the shutter of either of said windows to uncover such window and effect illumination of the signal arm and suitable means for moving the signal arm at the will of the operator.

3. Apparatus of the class specified, comprising a casing having windows in the sides thereof, illuminating means in said casing, hinged spring-pressed shutters on the exterior of the casing provided with extensions thereon and normally covering said windows, a signal arm movably arranged exteriorly of and adjacent to the casing and adapted to bear against the extension of the shutter of either of the windows to uncover such window and effect illumination of the signal arm, and suitable means for moving the signal arm at the will of the operator.

4. Apparatus of the class specified, comprising a casing having windows in the sides thereof, illuminating means in the casing, hinged spring-pressed shutters on the exterior of the casing provided with extensions thereon and normally covering said windows, a signal arm normally disposed between said extension and movably arranged on the exterior of the casing and adapted to bear against the extensions of the shutters of either of the windows to uncover such window and effect illumination of the signal arm, substantially as described.

5. Apparatus of the class specified, comprising a casing having windows in the sides thereof, illuminating means in the casing, shutters to uncover the windows, said shutters having one end thereof hingedly mounted on the exterior of the casing and provided with extensions on the other end thereof, springs arranged to press against the shutters to make the latter self closing, rollers on said extensions, a signal arm disposed between said extensions on the exterior of the casing, and means for moving the signal arm at will against the roller on the extension of either of the shutters to swing such shutter away from the window which it normally covers and effect illumination of the signal arm, substantially as described.

In testimony whereof, I have signed my name to this specification in the presence of two subscribing witnesses at Los Angeles county of Los Angeles, State of California, this 15th day of August A. D. 1913.

EDWARD A. TAPPE.

Witnesses:
　A. H. LIDDERS,
　ELLA SCOTT.